(12) United States Patent
Atake (10) Patent No.: US 6,231,328 B1
(45) Date of Patent: May 15, 2001

(54) FOIL-DECORATING INJECTION MOLDING APPARATUS

(75) Inventor: Hiroyuki Atake, Shinjuku-ku (JP)

(73) Assignee: Dai Nippon Printing Co., Ltd. (JP)

(*) Notice: Subject to any disclaimer, the term of this patent is extended or adjusted under 35 U.S.C. 154(b) by 0 days.

(21) Appl. No.: 09/289,935

(22) Filed: Apr. 13, 1999

Related U.S. Application Data (62) Division of application No. 08/904,308, filed on Jul. 31, 1997, now Pat. No. 5,945,059.

(30) Foreign Application Priority Data

Jul. 31, 1996 (JP) .................................................. 8-202410

(51) Int. Cl.$^7$ .................................................. B29C 44/52
(52) U.S. Cl. ...................... 425/122; 425/126.1; 425/127; 425/129.1
(58) Field of Search ............................. 425/122, 126.1, 425/129.1, 127

(56) References Cited

U.S. PATENT DOCUMENTS

| | | | |
|---|---|---|---|
| 3,584,109 | 6/1971 | Meadors et al. | 264/292 |
| 3,943,215 | 3/1976 | Grune et al. | 425/388 |
| 3,966,860 | 6/1976 | Hudson et al. | 425/388 |
| 4,216,184 | 8/1980 | Thomas | 425/112 |
| 4,226,577 | 10/1980 | Sawada | 425/111 |
| 4,639,341 * | 1/1987 | Hanamoto | 264/40 |
| 5,017,114 | 5/1991 | Onnenberg et al. | 425/388 |
| 5,232,643 | 8/1993 | Purser | 264/511 |
| 5,415,536 * | 5/1995 | Ohno | 425/121 |
| 5,676,981 * | 10/1997 | Miyazawa et al. | 425/112 |
| 5,707,581 * | 1/1998 | Yamazaki | 264/511 |
| 5,925,302 * | 7/1999 | Oono et al. | 264/267 |

FOREIGN PATENT DOCUMENTS

| | | | |
|---|---|---|---|
| B 1-59095 | * | 12/1989 | (JP) . |
| 4-34004 U | * | 8/1992 | (JP) . |
| 7-227877 | * | 8/1995 | (JP) . |
| WO 90/11878 | | 10/1990 | (WO) . |
| WO 94/25244 | | 11/1994 | (WO) . |

OTHER PUBLICATIONS

Paent Abstracts of Japan vol. 11, No. 166 (M–593) [2613], May 28, 1987 & JP 61 297115 A (Japan Steel Works Ltd), Dec. 27, 1986 *abstract*.

Patent Abstracts of Japan vol. 16, No. 450 (M–1312), Sep. 18, 1992 & JP 04 158015 A (Nissha Printing Co Ltd), Jun. 1, 1992, *abstract*.

Patent Abstracts of Japan vol. 10, No. 77 (M–464) [2134], Mar. 26, 1986 & JP 60 220717 A ( Toyota Jidosha KK), Nov. 5, 1985 *abstract*.

Patent Abstracts of Japan vol. 95, No. 11, Dec. 26, 1995 & JP 07 227877 a (Dai Nippon Printing Co Ltd), Aug. 29, 1995 *abstract*.

* cited by examiner

Primary Examiner—Harold Pyon
Assistant Examiner—Joseph S. Del Sole
(74) Attorney, Agent, or Firm—Parkhurst & Wendel, L.L.P (57) ABSTRACT

A foil-decorating injection molding method and a foil-decorating injection molding apparatus adjust the tautness of a decorative sheet fed onto a parting surface of a female mold so that tensions $T_1$, $T_2$ and $T_3$ of the decorative sheet during a sheet feed operation of the sheet feed means, at the start of the sheet clamping operation of the clamper for pressing and fixing the decorative sheet and at a moment immediately before the completion of the sheet clamping operation, respectively, meet an inequality: $T_1 \geq T_2 > T_3$ to prevent the decorative sheet from breaking or slipping off the clamper when clamping the decorative sheet on the parting surface of the female mold.

3 Claims, 8 Drawing Sheets

FOIL-DECORATING INJECTION MOLDING APPARATUS

This is a Division of application Ser. No. 08/904,308 filed Jul. 31, 1997.

BACKGROUND OF THE INVENTION

1. Field of the Invention

The present invention relates to a foil-decorating injection molding method that molds decorative sheet carrying patterns and characters into a molding in a mold by injection molding to produce a molding decorated with the patterns and the characters, and a foil-decorating injection molding apparatus for carrying out the foil-decorating injection molding method.

2. Description of the Related Art

There have been proposed many foil-decorating injection molding methods that mold a decorative sheet carrying patterns and characters into a molding in a mold by injection molding to produce a molding decorated with the patterns and the characters. Most of those previously proposed foil-decorating injection molding methods carry out all or some of the following processes (a) to (i) in that order or in order of a sequence different from that of the processes (a) to (i) sequentially or some of those processes are carried out simultaneously or parallelly.

Process (a): A decorative sheet feed process for feeding a decorative sheet onto a parting surface of a female mold of an injection mold employed in injection molding Process (b): A sheet clamping process for clamping the decorative sheet to hold the decorative sheet fixedly on the parting surface of the female mold Process (c): A softening process for heating and softening the decorative sheet by a hot plate or the like Process (d): A drawing process for drawing the softened decorative sheet by vacuum forming and/or pressure forming so that the decorative sheet may conform to the inner surface of the female mold (Preparatory molding process)

Process (e): A mold closing process for closing the injection mold by moving the female mold to a male mold or by moving the male mold to the female mold Process (f): An injection molding process for injecting a fluid resin (molten resin) through the male mold into a cavity defined by the male mold and the female mold Process (g): A mold opening process for separating the male mold and the female mold Process (h): A trimming process for removing marginal portions of the decorative sheet Process (i): An ejecting process for ejecting the molding decorated with the decorative sheet from the female mold In a simultaneous process implementation mode, the plurality of processes are carried out simultaneously. For example, the process (b) for clamping the decorative sheet and the process (e) for closing the mold are accomplished simultaneously if the decorative sheet is held between the male mold and the female mold in the mold closing process. The process (d) for drawing the decorative sheet and the process (f) for injecting the molten resin into the injection mold can simultaneously be accomplished if the decorative sheet is drawn by the heat and the pressure of the molten resin injected into the injection mold.

A laminated decorative sheet or a transfer decorative sheet is used selectively depending on the type of product to be produced. If a laminated decorative sheet is used, the laminated decorative sheet is attached integrally to the surface of an injection-molded molding to form a decorative layer. If a transfer decorative sheet having a substrate and a decorative transfer layer formed on the substrate is used, the transfer decorative sheet is attached to the surface of a molding, and then the substrate is removed from the molding, so that only the decorative transfer layer remains on the surface of the molding.

In the conventional foil-decorating injection molding method comprising the foregoing processes, the tension of the decorative sheet is kept constant during the sheet feed process, at the start of the sheet clamping process and at a moment immediately before the completion of the sheet clamping process, or the tension of the decorative sheet is increased in the sheet clamping process subsequent to the feed of the decorative sheet onto the parting surface of the female mold, which is described in, for example, JP-B No. 1-59095 and JP-U No. 4-34004. The decorative sheet is broken sometimes when the same is clamped if the decorative sheet is tautened excessively or the decorative sheet sometimes is slackened to crease or the decorative sheet is dislocated from a correct position if the decorative sheet is excessively slack.

Figure 8A:
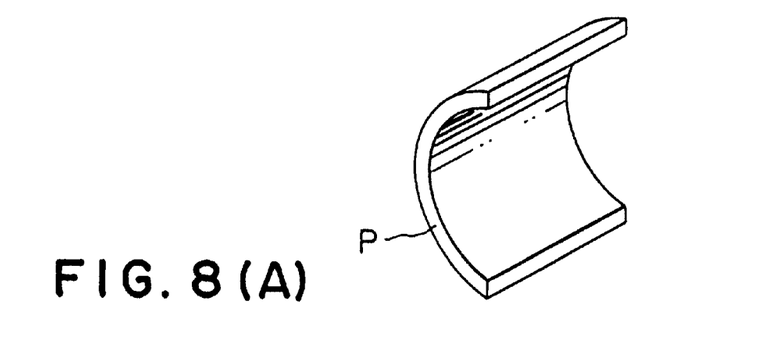
FIGS. 8(A), 8(B) and 8(C) are a perspective view of a molding produced by a foil-decorating injection molding apparatus, a perspective view of a clamper employed in producing the molding, and a plan view of assistance in explaining problems in producing the molding, respectively.
Figure 8B:
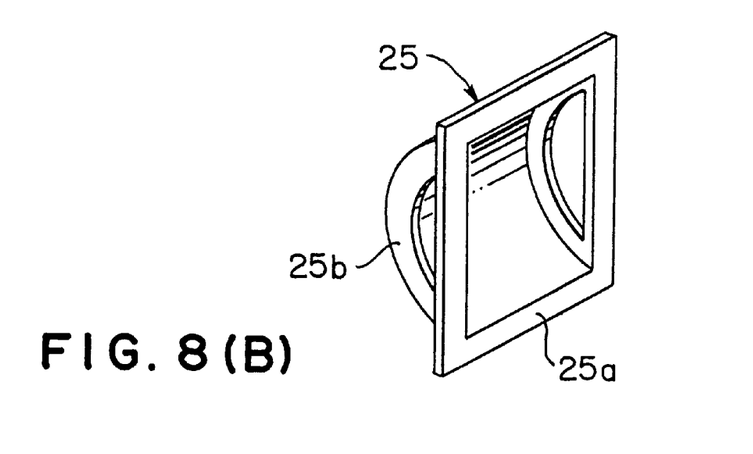
Figure 8C:
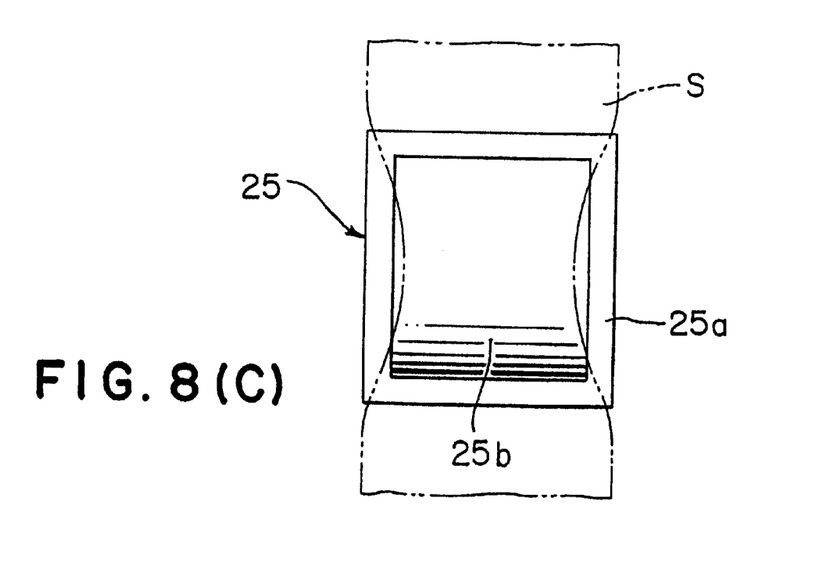

As mentioned in JP-A No. 7-227877, when a molding to be produced is, for example, a control panel P as shown in FIG. 8(A) for a rice boiler, having the shape of a curved surface having a relatively great height and resembling a portion of a circular cylinder, an injection molding apparatus sometimes employs a special damper 25 as shown in FIG. 8(B). The special damper 25 has a frame-shaped clamping part 25a having the shape of a frame to press and hold a decorative sheet on the parting surface of the female mold, and a sheet pressing part 25b having the shape of a two-dimensional curved surface to press part of the decorative sheet into a recess formed in the female mold. When the special damper 25 is employed, it is possible that a further problem arises in addition to the foregoing problems; that is, the tension of a decorative sheet S increases sharply as the special damper 25 presses the decorative sheet S to clamp and hold the decorative sheet S and, as shown in FIG. 8(C), portions of the opposite sides of the decorative sheet S slip off the opposite side members of the frame-shaped clamping part 25a into the recess as shown in FIG. 8(C) and, consequently, the decorative sheet cannot properly be clamped.

SUMMARY OF THE INVENTION

The present invention has been made in view of the foregoing problems in the prior art and it is therefore an object of the present invention to provide a foil-decorating injection molding method that adjusts the tension of a decorative sheet so that the decorative sheet may not break, may not slip off a clamper, may not crease and may not be dislocated when the clamper clamps the decorative sheet.

Another object of the present invention is to provide a foil-decorating injection molding apparatus capable of adjusting the tension of a decorative sheet so that the decorative sheet may not break, may not slip off a clamper, may not crease and may not be dislocated when the clamper clamps the decorative sheet.

According to one aspect of the present invention, a foil-decorating injection molding method comprises, as basic steps, a sheet feed process for feeding a web-fed decorative sheet unwound from a roll of web onto a parting surface of a female mold of an injection mold, a sheet clamping process for pressing and fixing the decorative sheet on the parting surface of the female mold, a drawing process for drawing the decorative sheet so as to conform to the inner surface of the female mold defining a cavity, moving the female mold toward a male mold of the same injection mold or moving the male mold toward the female mold to close the injection mold so that the cavity is formed, an injection molding process for injecting a fluid resin through the male mold into the female mold to fill up the cavity, a mold opening process for separating the male mold and the female mold from each other to open the injection mold, and a mold ejecting process for ejecting an injection-molded molding from the female mold. Those processes are carried out in the foregoing order or in order of a sequence different from the foregoing order sequentially or some of those processes are carried out simultaneously or parallelly.

The tensions $T_1$, $T_2$ and $T_3$ of the decorative sheet during the sheet feed process, at a moment when the sheet clamping process is started and at a moment immediately before the completion of the sheet clamping process, respectively, are adjusted so as to meet an inequality: $T_1 \geqq T_2 > T_3$.

Desirably, the decorative sheet is heated by a hot plate or the like for softening by a softening process before the drawing process. However, the softening process is not essential.

According to another aspect of the present invention, a foil-decorating injection molding apparatus comprises an injection mold having a male mold and a female mold, one of the male mold and the female mold is movable relative to the other, sheet feed mechanism for feeding a decorative sheet from a roll of web having decorative sheet onto a parting surface of the female mold, a damper capable of moving in directions perpendicular to the parting surface of the female mold and of pressing the decorative sheet against the parting surface of the female mold to hold the decorative sheet on the parting surface of the female mold for a sheet clamping operation, and a resin injecting mechanism for injecting a fluid resin through the male mold into a cavity formed between the male mold and the female mold to fill up the cavity with the fluid resin. The foil-decorating injection molding apparatus is characterized by a tension adjusting means for adjusting the tautness of the decorative sheet so that tensions $T_1$, $T_2$ and $T_3$ of the decorative sheet during a sheet feed operation of the sheet feed mechanism, at the start of the sheet clamping operation of the damper for pressing and fixing the decorative sheet and at a moment immediately before the completion of the sheet clamping operation, respectively, meet an inequality: $T_1 \geqq T_2 > T_3$.

The damper employed in the foil-decorating injection molding apparatus of the present invention may be such as having only a flat frame-shaped clamping part for pressing and fixing the decorative sheet on the parting surface of the female mold or such as having a flat frame-shaped clamping part and a two-dimensionally curved or bent sheet pressing part for pressing part of the decorative sheet into the recess formed in the female mold. The effect of the present invention is conspicuous particularly when the latter clamper is employed.

The tension adjusting mechanism of the foil-decorating injection molding apparatus of the present invention may be a known tension adjusting mechanism such as disclosed in JP-B No. 1-59095 comprising a sheet feed mechanism including a reel on which a web of decorative sheet is wound in a roll, and a variable braking device capable of applying a desired braking force to the reel, and a pair of feed rollers disposed below the sheet feed mechanism with respect to a decorative sheet feed direction, or may be such as disclosed in JP-U No. 4-34004 comprising pull rollers disposed below the female mold with respect to a decorative sheet feed direction to pull the decorative sheet so that the decorative sheet is extended over the parting surface of the female mold, and a dancer roller capable of biasing the decorative sheet in a direction perpendicular to the decorative sheet feed direction.

As mentioned above, the foil-decorating injection molding apparatus is provided with the damper capable of moving in directions perpendicular to the parting surface of the female mold and of pressing the decorative sheet against the parting surface of the female mold to hold the decorative sheet on the parting surface of the female mold, and the damper is advanced toward and moved away from the parting surface (the decorative sheet) in directions perpendicular to the parting surface of the female mold by a drive means. The drive means may comprise a pneumatic cylinder actuator for driving the clamper, and a control means for controlling the pneumatic cylinder actuator or an ejector pin driving means may be used also as a drive means for driving the clamper.

The male mold and the female mold are made of a metal, such as an iron base alloy, or a ceramic material, and may be composite molds if the shape of a molding to be molded therein requires. When the decorative sheet is subjected to a preforming process, the foil-decorating injection molding apparatus is provided with a heating-and-softening means, such as a hot plate, and the male mold and the female mold are provided with pores to supply compressed air into the cavity for preforming or to evacuate the cavity for vacuum forming.

Positioning marks, such as +-shaped marks, --shaped marks or I-shaped marks, may be formed on the decorative sheet, the positioning marks may be detected by detectors, such as photoelectric cells or image sensors, disposed around or on the female mold, and the operation of a driving means, such as a servomotor, included in the sheet feed mechanism on the basis of the output signals of the detectors to position a decorative pattern formed on the decorative sheet in a high accuracy relative to the inner surface of the female mold defining a cavity. If the decorative sheets are those not requiring accurate positioning, such as unfigured ones or those provided with repetitious patterns, the web of decorative sheet may simply be fed by a fixed length at a time by controlling a stepping motor or the like included in the sheet feed mechanism. The decorative sheet may be a laminated decorative sheet consisting of a base sheet and a decorative layer laminated to the base sheet or a transfer decorative sheet consisting of a base sheet and a decorative transfer layer. The laminated decorative sheet is incorporated into a molding to form a decorating layer. The transfer decorative sheet is attached to a molding, and then only the base sheet is removed from the molding and the decorative transfer layer is left on the molding.

The base sheet may be made of a thermoplastic resin, such as polyvinyl chloride, an acrylic resin, polystyrene, an ABS resin, a polycarbonate resin, a polyester resin or polypropylene. The thickness of the base sheet is in the range of about 20 to about 500 $\mu$m. The decorative layer may be an aesthetic layer, such as a film provided with printed patterns, a colored or transparent film or a metal thin film, or a functional layer, such as a hard film, an antidim film or a conductive film.

The fluid resin to be injected into the injection mold by the resin injecting mechanism may be any one of generally known resins suitable for foil-decorating injection molding including heated and melted thermoplastic resins, such as an ABS resin (acrylonitrile-butadiene-styrene copolymer resin), polystyrene, polycarbonate and polypropylene, two-part resins and catalytic curing resins, such as polyurethane resins and unsaturated polyesters.

When carrying out the foil-decorating injection molding method of the present invention by the foil-decorating injection molding apparatus of the present invention, a necessary length of the web of decorative sheet, i.e., a length of the web of decorative sheet for one injection molding cycle is fed at a time from the reel by a pair of feed rollers and a pair of pulling rollers included in, for example, a tension adjusting mechanism onto the parting surface of the female mold so as to cover the recess formed in the female mold. A brake device included in the tension adjusting mechanism exerts a maximum braking force during the decorative sheet feed operation to adjust the tension of the decorative sheet to a highest tension $T_1$ of 13 kg. Then, the clamper is advanced toward the female mold to start a decorative sheet pressing and fixing operation, i.e., a decorative sheet clamping operation and, at the same time, one of the pair of feed rollers is separated from the decorative sheet and the braking force of the brake device is reduced. Consequently, a short length of the web of decorative sheet is unwound from the reel and the tension of the decorative sheet is reduced to a tension $T_2$ lower than the tension $T_1$ at the start of the clamping operation. The tension $T_2$ is, for example, 10 kg. The decorative sheet thus tautened is pressed against the parting surface of the female mold by the clamper. If the damper is a special damper similar to the special damper shown in FIG. 8(B) having the sheet pressing part having the shape of a two-dimensional curved surface, part of the decorative sheet is pressed into the recess formed in the female mold by the sheet pressing part. The braking force of the brake device included in the tension adjusting mechanism is further reduced immediately before the decorative sheet is pressed against the parting surface of the female mold by the clamping frame part of the damper to unwind another length of the web of decorative sheets from the reel, so that the tension of the decorative sheet is further reduced to a tension $T_3$ of, for example, 3 kg, which is lower than the tension $T_2$. Since the decorative sheet is tautened at the maximum tension when the same is fed onto the parting surface of the female mold, the decorative sheet will not crease and will not be dislocated. Since the tension of the decorative sheet is reduced gradually at the start of the sheet clamping operation and at a moment immediately before the completion of the sheet clamping operation, the decorative sheet will not break and will not slip off the clamper.

After the completion of the sheet clamping process, the softening process for heating and softening the decorative sheet by a hot plate or the like, the drawing process for drawing the decorative sheet so as to conform to the inner surface of the female mold by vacuum forming and/or pressure forming, the mold closing process for closing the injection mold by moving the female mold toward the male mold of the same injection mold or moving the male mold toward the female mold so that the cavity is formed between the male mold and the female mold, the injection molding process for injecting a fluid resin (molten resin) through the male mold into the female mold to fill up the cavity, and the mold opening process for separating the male mold. These processes are carried out in that order or in order of a sequence different from the foregoing sequence of the processes sequentially or some of those processes are carried out simultaneously or parallelly.

BRIEF DESCRIPTION OF THE DRAWINGS

The above and other objects, features and advantage of the present invention will become more apparent from the following description taken in connection with the accompanying drawings, in which.

DESCRIPTION OF THE PREFERRED EMBODIMENTS

Figure 1:
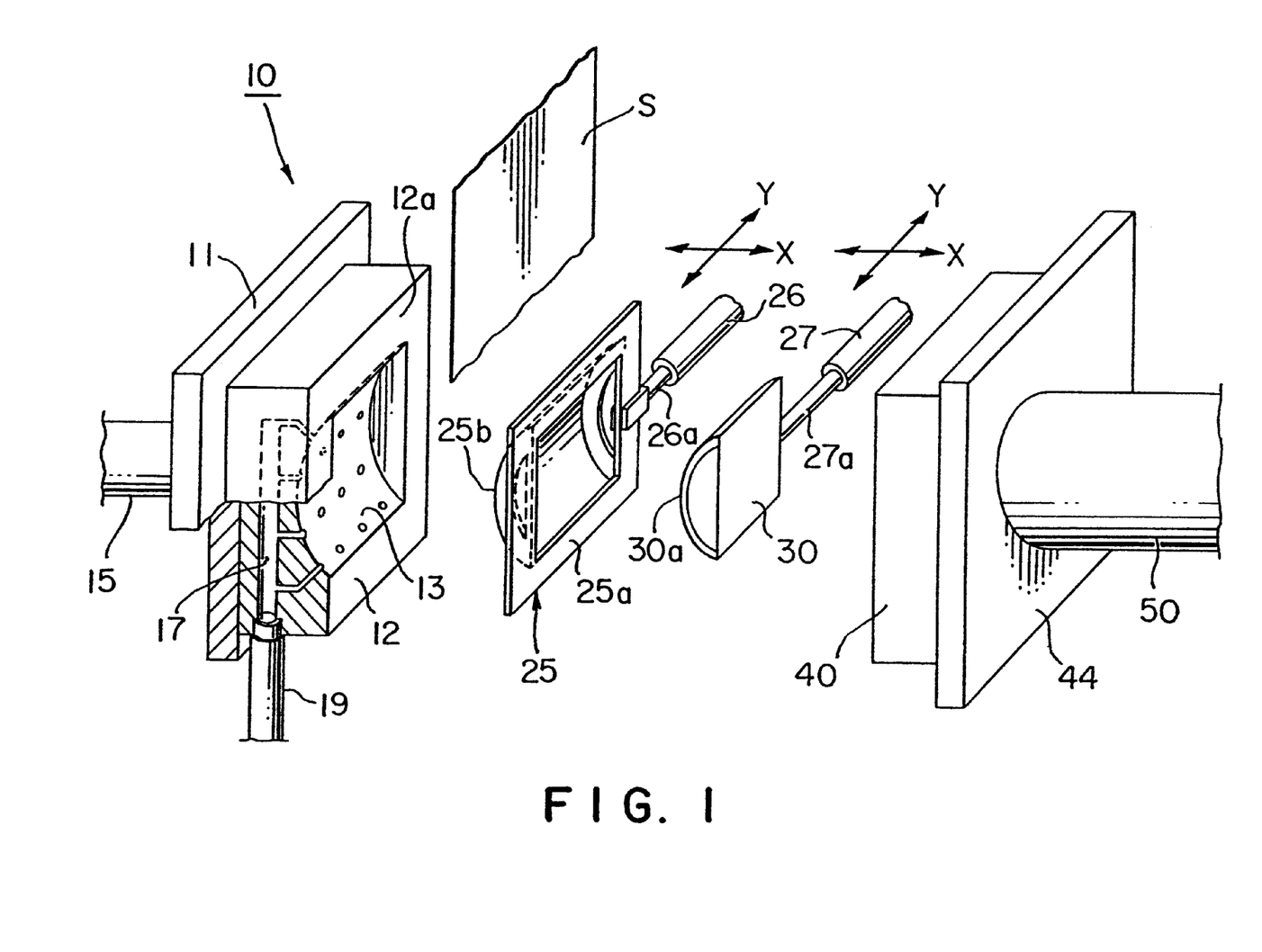
FIG. 1 is a schematic perspective view of an essential portion of a foil-decorating injection molding apparatus in a first embodiment according to the present invention.
Figure 2:
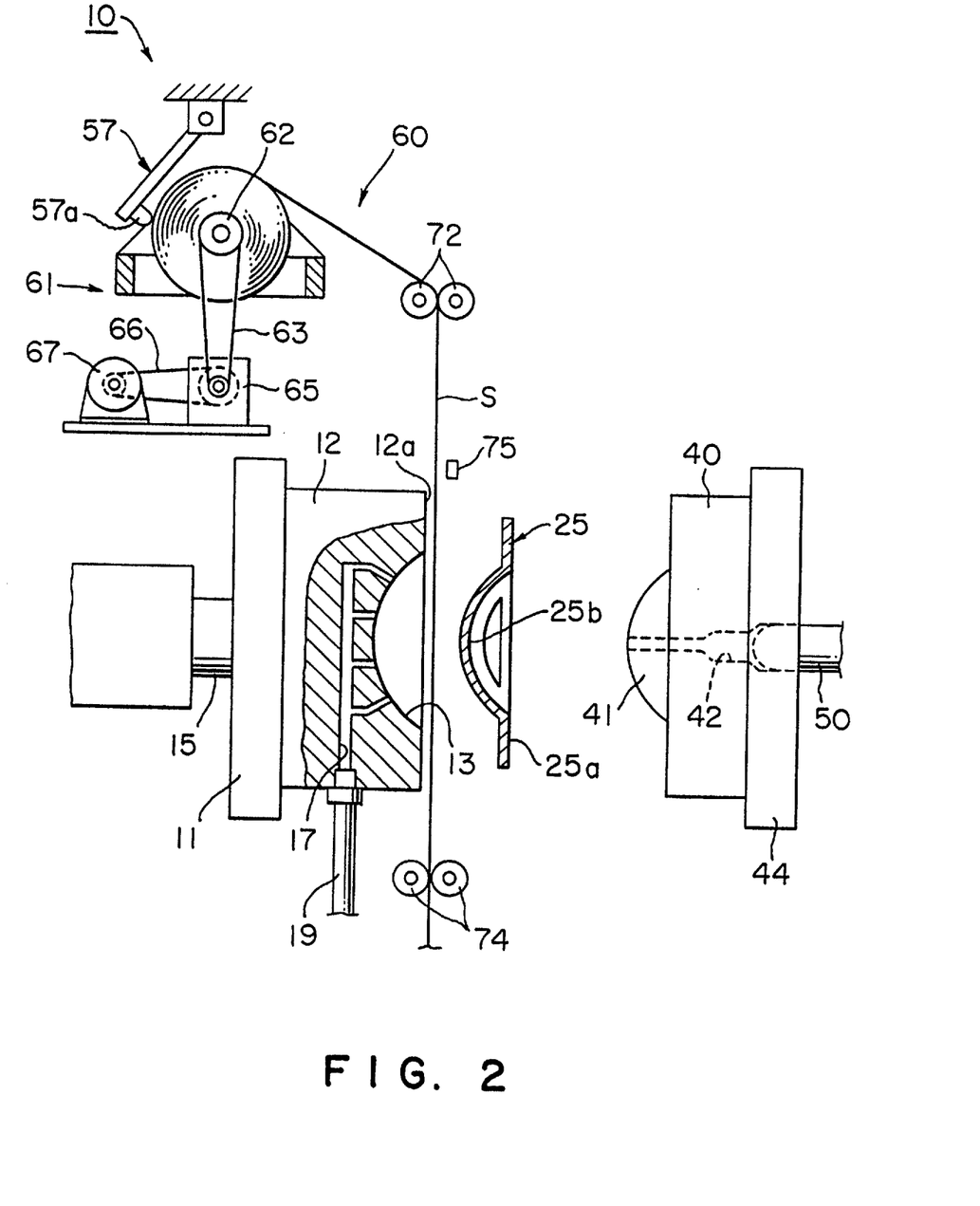
FIG. 2 is a schematic side view of the foil-decorating injection molding apparatus of FIG. 1.

Referring to FIGS. 1 and 2, a foil-decorating injection molding apparatus 10 in a first embodiment according to the present invention is provided with an injection mold having a female mold 12 and a male mold 40. A cavity corresponding to a molding P, FIG. 8(A), to be molded is defined by the female mold 12 and the male mold 40. The female mold 12 is fixedly held on a movable mold platen 11. The movable mold platen 11 is moved transversely (horizontally) as viewed in FIG. 1 by a ram 15 included in a hydraulic actuator; that is, the female mold 12 is moved toward and away from the male mold 40. The female mold 12 need not necessarily be moved horizontally relative to the male mold 40; the female mold 12 and the male mold 40 may be disposed in a vertical arrangement, and the female mold 12 may be moved relative to the male mold 40 or the male mold 40 may be moved relative to the female mold 12. A recess 13 for forming a cavity and corresponding to the shape of a molding P, such as the curved molding shown in FIG. 8(A), to be produced is formed in the female mold 12. Suction passages 17 are formed in the female mold 12 so as to open in the inner surface forming the recess 13 of the female mold 12. The suction passages 17 are connected by a pipe 19 to an external vacuum pump. The female mold 12 has a parting surface 12a and an O ring, not shown, is fitted in a groove formed in the parting surface 12a so as to surround the open end of the recess 13.

The male mold 40 is fixedly held on a stationary mold platen 44 fixedly mounted on a nozzle 50. The male mold 40 is provided in its central portion with a core 41 (FIG. 2) which forms a cavity in combination with the recess 13 of the female mold 12. A runner 42 is formed through the male mold 40 to inject a molten resin therethrough into the cavity defined by the recess 13 of the female mold 12 and the core 41 of the male mold 40. Four tie bars, not shown, are extended through the four corners of each of the movable mold platen 11 and the stationary mold platen 44 in a direction parallel to the X-axis (FIG. 1). The female mold 12 is restrained from movement in directions perpendicular to the X-axis by the tie bars and moves toward and away from the male mold 40 along the tie bars.

A clamper 25 is supported on an actuating rod 26a included in a cylinder actuator 26, and a hot plate 30 for heating and softening a decorative sheet S is supported on an actuating rod 27a included in a cylinder actuator 27. The cylinder actuator 26 moves the damper 25 and the cylinder actuator 27 moves the hot plate 30 in directions parallel to the parting surface 12a of the female mold 12, i.e., parallel to the Y-axis (FIG. 1), into and away from the path of the female mold 12 and in directions perpendicular to the parting surface 12a of the female mold 12, i.e., parallel to the X-axis. The damper 25, similarly to that shown in FIG. 8(B), has a frame-shaped clamping part 25a for fixedly pressing the decorative sheet S on the parting surface 12a of the female mold 12, and a two-dimensionally curved pressing part 25b for pressing part of the decorative sheet S into the recess 13 of the female mold 12. The hot plate 30 has a curved heating surface 30a corresponding to the molding P.

A decorative sheet feed unit 60 (FIG. 2) feeds a decorative sheet S. The decorative sheet feed unit 60 comprises a reel 62 supporting a roll of a web of decorative sheets S, a tension adjusting mechanism 61 including a belt-and-pulley transmission mechanism 66, a variable electromagnetic brake device 65 for properly braking the reel 62 and a motor 67, a pair of feed rollers 72 disposed above the path of the female mold 12, and a pair of pull rollers 74 disposed below the path of the female mold 12. The rotative driving force of the motor 67 is transmitted through the belt-and-pulley transmission mechanism 66 to the brake device 65. The rotative driving force of the brake device 65 is transmitted through a belt-and-pulley transmission mechanism 63 to the reel 62. The torque of the reel 62 can be changed by the braking force of the brake device 65. A roller 57a of a roll diameter measuring device 57 is pressed against the surface of the roll of a web of decorative sheet S supported on the reel 62. The braking force of the brake device 65, i.e., power supplied to the brake device 65, must be regulated according to the diameter of the roll of a web of decorative sheets S to regulate the decorative sheet S unwound from the roll of a web at a desired tension. Therefore, the diameter of the roll is measured continuously by the roll diameter measuring device 57.

The decorative sheet S used when producing a molding P by the foil-decorating injection molding apparatus 10 is a transfer decorative sheet having a 50 μm thick PET base sheet, and a decorative transfer layer formed by printing on the PET base sheet. Positioning marks are formed on an outer surface of the decorative transfer layer.

When the foil-decorating injection molding apparatus 10 operates for injection molding, the motor 67 of the tension adjusting mechanism 61 of the decorative sheet feed unit 60 is driven for operation, a necessary length of the web, i.e., a length of the web for one injection molding cycle corresponding to the length of one decorative sheet S, is fed at a time by the pair of feed rollers 72 and the pair of pull rollers 74 so as to extend over the parting surface 12a of the female mold 12 as shown in FIG. 2. While the web is being unwound from the roll, the braking force of the brake device 65 of the decorative sheet feed unit 60 is increased to a maximum to tauten the decorative sheet S at a maximum tension $T_1$ of, for example, 13 kg.

Figure 3:
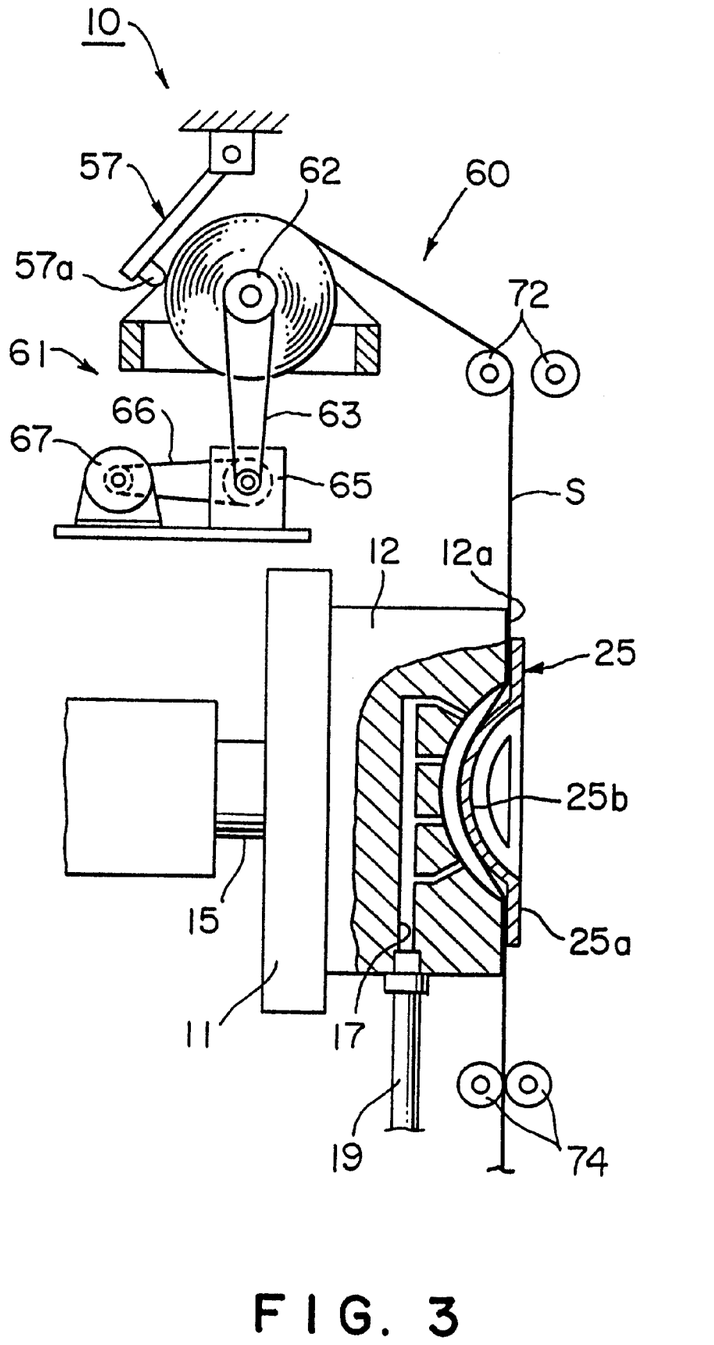
FIG. 3 is a view similar to FIG. 2, for assistance in explaining the operation of the foil-decorating injection molding apparatus of FIG. 1.

The damper 25 which has been moved to a position opposite the parting surface 12a of the female mold 12 is moved toward the parting surface 12a of the female mold 12, i.e., toward the decorative sheet S to start a decorative sheet pressing and fixing operation. Then, as shown in FIG. 3, one of the pair of feed rollers 72 is separated from the web of decorative sheets S, and the braking force of the brake device 65 is reduced. Consequently, some length of the web of decorative sheets S is unwound from the roll supported on the reel 62 so that the tension of the decorative sheet S is reduced from the tension $T_1$ to a tension $T_2$ of, for example, 10 kg at a moment when a sheet clamping operation is started.

The decorative sheet S thus tautened at the tension $T_2$ is pressed toward the parting surface 12a by the clamper 25. Part of the decorative sheet S is pressed into the recess 13 of the female mold 12 by the sheet pressing part 25b of the damper 25.

The braking force of the brake device 65 of the decorative sheet feed unit 60 is reduced further at a moment immediately before the completion of the sheet clamping operation, for example, 0.5 sec before the completion of the sheet clamping operation, i.e., a moment immediately before the decorative sheet S is held firmly between the frame-shaped clamping part 25a and the parting surface 12a of the female mold 12, and, consequently, the web is further unwound from the roll supported on the reel 62 to tauten the decorative sheet S at a tension $T_3$ of, for example, 3 kg. Since the decorative sheet S is tautened at the maximum tension $T_1$ when the same is being fed, the decorative sheet S may not crease and may not be dislocated. Since the tension of the decorative sheet S is reduced stepwise at a moment immediately before the start of the sheet clamping operation and at a moment immediately before the completion of the sheet clamping operation, the decorative sheet S may not break and may not slip off the damper 25.

Figure 4:
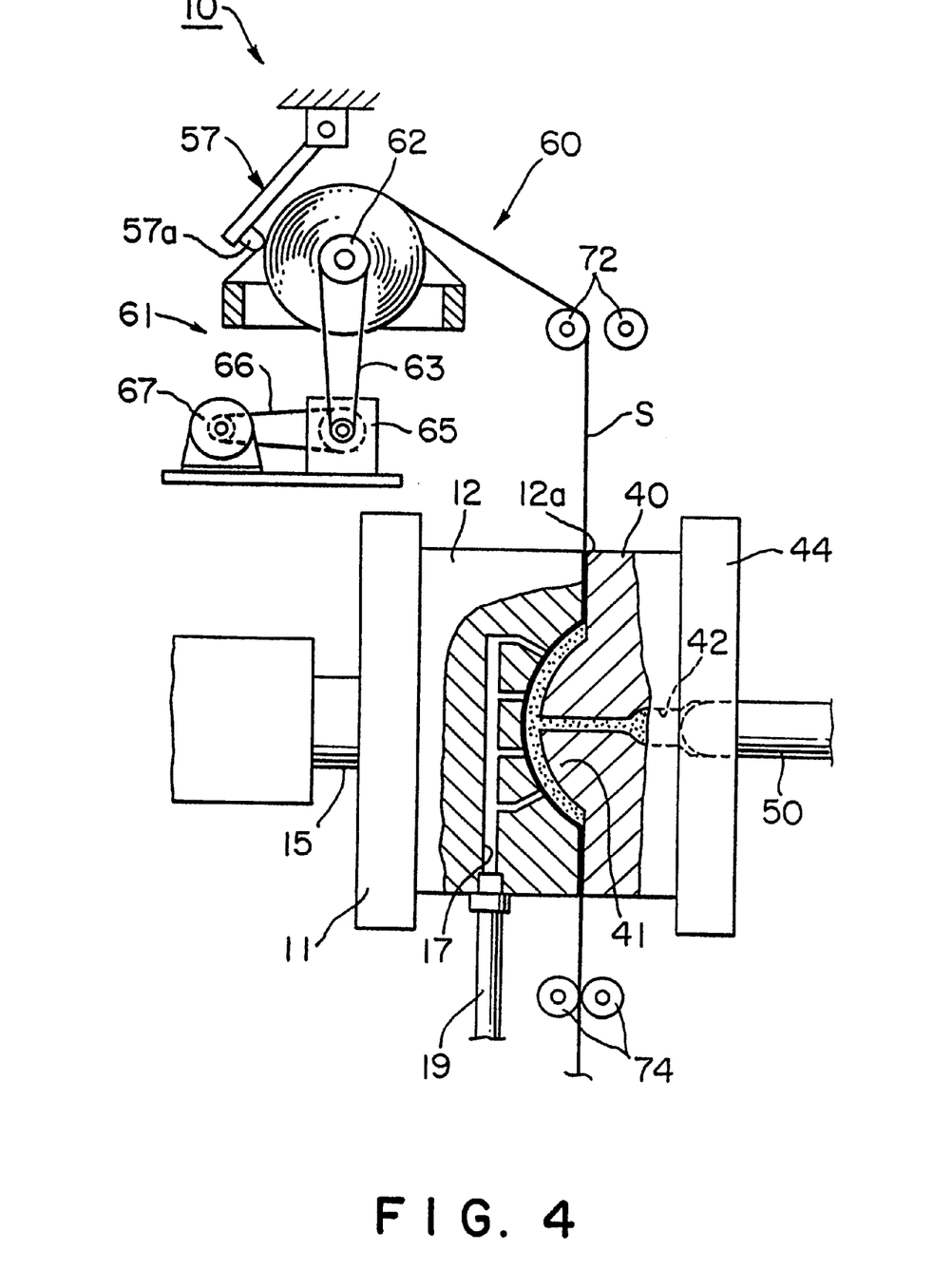
FIG. 4 is a view similar to FIG. 2, for assistance in explaining an operation of the foil-decorating injection molding apparatus of FIG. 1 for an injection molding process.

After thus completing a sheet clamping process for clamping the decorative sheet S on the parting surface 12a of the female die 12, a softening process for softening the decorative sheet S by heating the same by the hot plate 30, a drawing process for drawing the decorative sheet S so as to conform to the inner surface 12a of the female mold 12 by vacuum forming (preforming process), a mold closing process for closing the injection mold by moving the female mold 12 toward the male mold 40 and joining the female mold 12 to the male mold 40 to form a cavity between the female mold 12 and the male mold 40, an injection molding process for injecting a fluid resin (molten resin) through the male mold 40 into the cavity (FIG. 4), and a mold opening process for opening the injection mold by separating the female mold 12 from the male mold 40, are carried out sequentially.

Figure 5A:
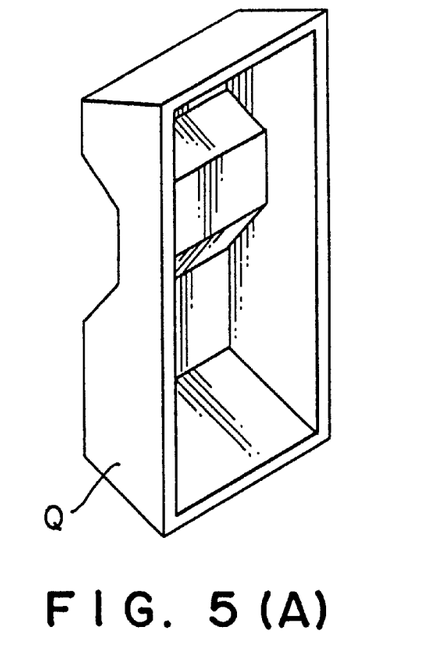
FIGS. 5(A) and 5(B) are perspective views of a molding molded by a foil-decorating injection molding apparatus in a second embodiment according to the present invention and a clamper employed by the same foil-decorating injection molding apparatus, respectively.
Figure 5B:
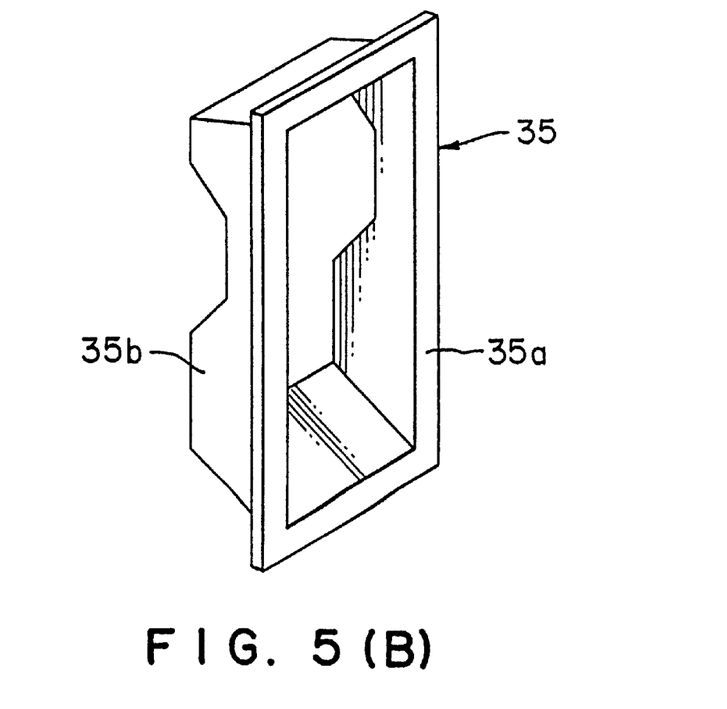
Figure 6:
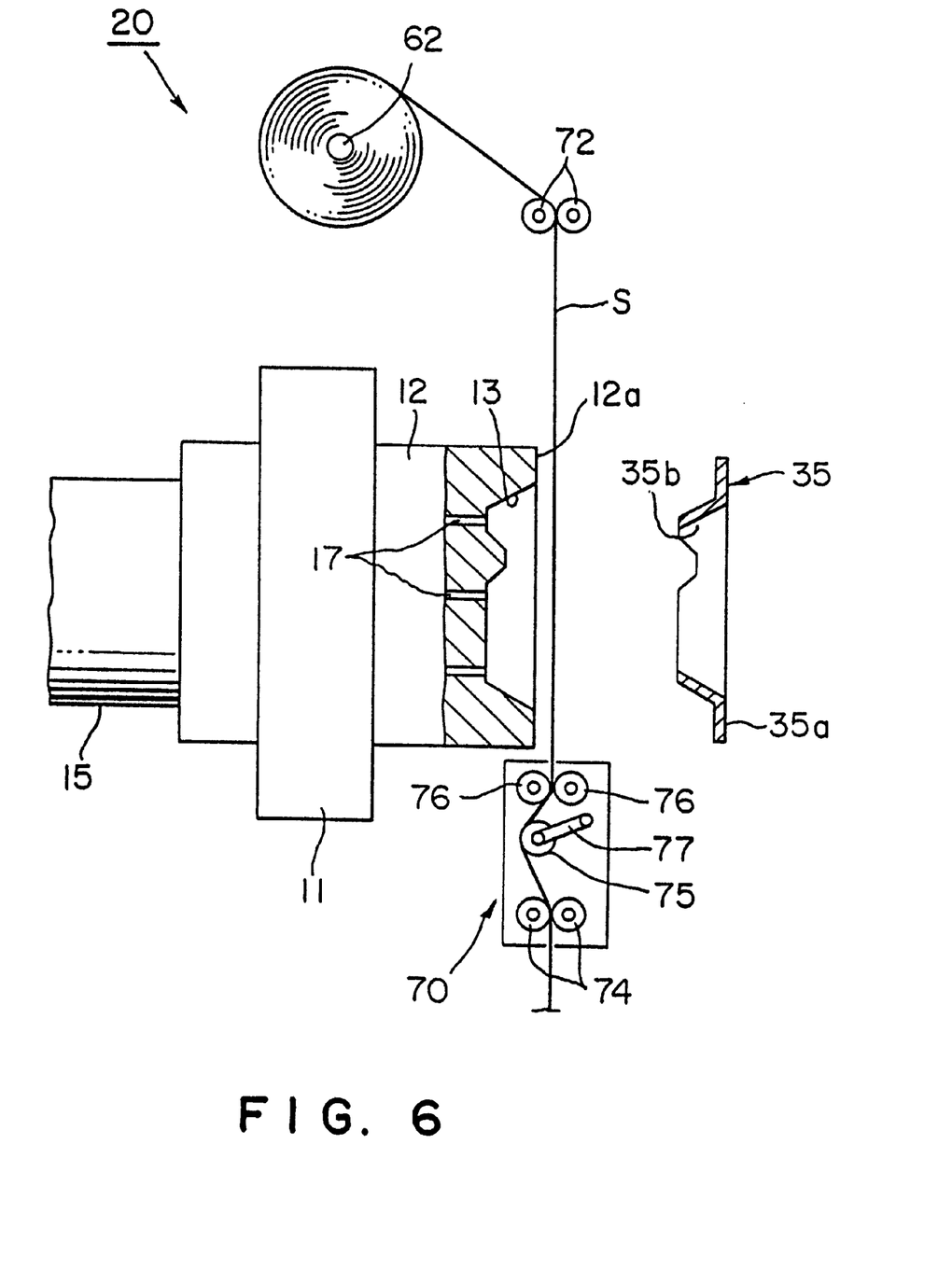
FIG. 6 is a schematic side view of the foil-decorating injection molding apparatus in the second embodiment.
Figure 7:
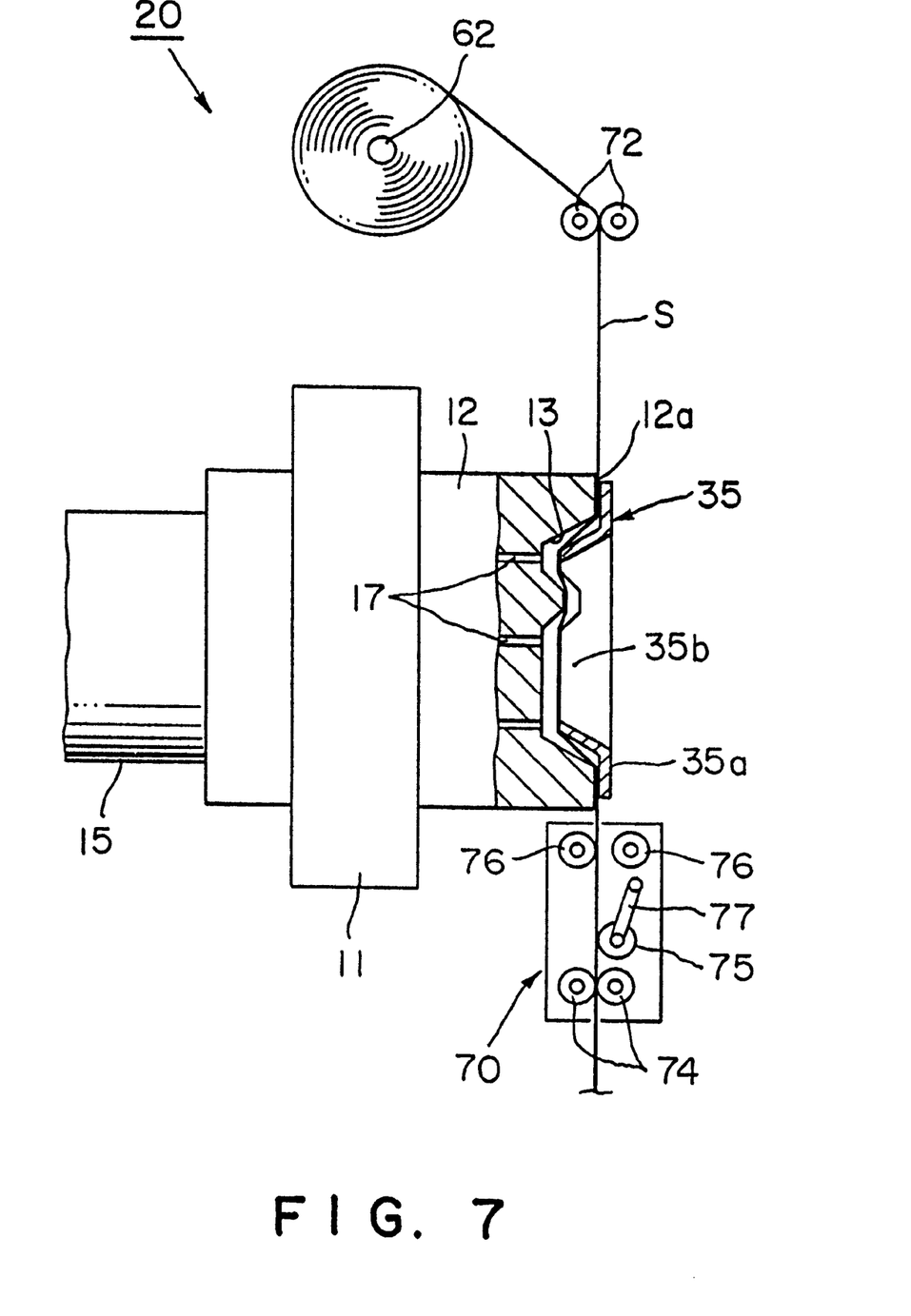
FIG. 7 is a view similar to FIG. 6, for assistance in explaining the operation of the foil-decorating injection molding apparatus of FIG. 6.

FIG. 5(A) shows a molding Q, such as a decorative panel for an automobile AT gear, molded by a foil-decorating injection molding apparatus 20 (FIGS. 6 and 7) in a second embodiment according to the present invention. FIG. 5(B) shows a special damper 35 employed in injection-molding the molding Q. The special damper 35 has a frame-shaped part 35a and a sheet pressing part 35b having an undulating wall. FIGS. 6 and 7 show the foil-decorating injection molding apparatus 20 in the second embodiment which uses the damper 35, in which parts like or corresponding to those of the foregoing foil-decorating injection molding apparatus 10 in the first embodiment are designated by the same reference characters and the description thereof will be omitted.

Referring to FIGS. 6 and 7, the foil-decorating injection molding apparatus 10 is provided with a decorative sheet feed unit 70 provided with a tension adjusting mechanism different from the tension adjusting mechanism 61 of the first embodiment. The decorative sheet feed unit 70 comprises a pair of feed rollers 72 disposed above a female mold 12 with respect to a direction in which a web of decorative sheet S is fed, to feed the web of decorative sheets S, a pair of pull rollers 74 disposed below the female mold 12 with respect to the direction in which the web of decorative sheet S is fed to pull the web of decorative sheets S, a pair of pinch rollers 76 disposed between the female mold 12 and the pair of pull rollers 74, and a dancer roller device including a dancer roller 75 and a swing arm 77 supporting the dancer roller 75 on its free end and pressing the dancer roller 75 against a portion of a decorative sheet S extending between the pair of pinch rollers 76 and the pair of pull rollers 74 in a direction perpendicular to the decorative sheet S. When feeding the decorative sheet S on the foil-decorating injection molding apparatus 20, a necessary length of the web of decorative sheets S, i.e., a length of the web necessary for one injection molding cycle, is fed at a time by the pair of feed rollers 72 and the pair of pull rollers 74, and the swing arm 77 is turned so that the dancer roller 75 pushes the decorative sheet S to an extreme position, i.e., a leftmost position as viewed in FIG. 6. Consequently, the decorative sheet S is extended so as to cover the parting surface 12a of a female mold 12. When thus feeding the decorative sheet S, the pull rollers 74 are driven for rotation at a surface velocity slightly higher than that of the feed rollers 72 to tauten the decorative sheet S at a maximum tension $T_1$ of, for example, 13 kg.

The damper 35, which has been disposed opposite to the parting surface 12a of the female mold 12, is advanced toward the parting surface 12a to start the sheet clamping operation. Then, as shown in FIG. 7, one of the pinch rollers 76 is separated from the decorative sheet S and the swing arm 77 is turned in the reverse direction to retract the dancer roller 75 from the decorative sheet S. Consequently, the decorative sheet S is tautened at a tension $T_2$ lower than the maximum tension $T_1$ at the start of the sheet clamping operation. The tension $T_2$ is, for example, 8 kg. With the decorative sheet S thus tautened, the damper 35 presses the decorative sheet S toward the parting surface 12a of the female mold 12, and part of the decorative sheet S is pushed by the sheet pressing part 35b into a recess 13 formed in the female mold 12. The dancer roller 75 is retracted and separated from the decorative sheet S as shown in FIG. 7 at a moment immediately before decorative sheet S is clamped between the frame-shaped part 35a and the parting surface 12a of the female mold 12 and, consequently, the decorative sheet S is tautened at a moment immediately before the completion of the sheet clamping operation at a tension $T_3$ lower than the tension $T_2$ at the start of the sheet clamping operation. The tension $T_3$ is, for example, 3 kg. Since the decorative sheet S is tautened at the maximum tension $T_1$, when the same is being fed, the decorative sheet S may not crease and may not be dislocated. Since the tension of the decorative sheet S is reduced stepwise at a moment immediately before the start of the sheet clamping operation and at a moment immediately before the completion of the sheet clamping operation, the decorative sheet S may not break and may not slip off the damper 35.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A foil-decorating injection molding apparatus comprising:

an injection mold including a male mold and a female mold having a recess for forming a cavity, one of the male mold and the female mold being movable relative to the other;

sheet feed means for unwinding a web of decorative sheet from a roll of the web and feeding a decorative sheet onto a parting surface of the female mold;

a clamper for moving in directions perpendicular to the parting surface of the female mold and for pressing the decorative sheet against the parting surface of the female mold to hold the decorative sheet fixedly on the parting surface for a sheet clamping operation;

resin injecting means for injecting a fluid resin through the male mold and the female mold to fill up the cavity with the fluid resin;

a tension adjusting device for adjusting a tautness of the decorative sheet, said tension adjusting device including a reel for supporting said roll of decorative sheet, an adjustable braking device for applying a desired braking force to said reel, and a pair of feed rollers disposed downstream of the reel but upstream of the female mold with respect to a decorative sheet feed direction to feed the decorative sheet from said roll in a nip of the feed rollers, one of said feed rollers being movable away from the other to open said nip to release the decorative sheet being fed in said nip from the feed rollers; and pull rollers disposed downstream of the female mold with respect to a decorative sheet feed direction to pull the decorative sheet so that the decorative sheet is extended over the parting surface of the female mold;

wherein said feed rollers are operable to feed the decorative sheet in the nip of the feed rollers with said braking device being set to apply a first tension ($T_1$) to the decorative sheet when the decorative sheet is fed onto the parting surface of the female mold, said feed rollers being also operable to cause one of the feed rollers to move away from the other to release the decorative sheet extending in said nip to thereby change the first tension ($T_1$) to a second tension ($T_2$) that is equal to or smaller than the first tension, at a start of the sheet clamping operation for pressing the decorative sheet against the parting surface, said braking device being operable to change the second tension ($T_2$) to a third tension ($T_3$) that is smaller than the second tension, at a moment immediately before completion of said sheet clamping operation.

2. The foil-decorating injection molding apparatus according to claim 1, wherein the damper has a flat frame-shaped clamping part for fixedly pressing the decorative sheet against the parting surface of the female mold, and a two-dimensionally curved or bent sheet pressing part for pressing part of the decorative sheet into the recess formed in the female mold to form a cavity.

3. The foil-decorating injection molding apparatus according to claim 1, further comprising a dancer roller upstream of said pull rollers for biasing the decorative sheet in a direction perpendicular to the decorative sheet feed direction.

* * * * *